United States Patent
Lin et al.

(10) Patent No.: US 9,556,848 B2
(45) Date of Patent: Jan. 31, 2017

(54) TIDAL CURRENT GENERATING DEVICE AND INSTALLATION FRAME THEREOF

(71) Applicant: Hangzhou LHD Institute of New Energy, LLC, Hangzhou, Zhejiang (CN)

(72) Inventors: Dong Lin, Zhejiang (CN); Changzheng Huang, Zhejiang (CN); Zhenghan Chen, Zhejiang (CN)

(73) Assignee: HANGZHOU LHD INSTITUTE OF NEW ENERGY, LLC, Hangzhou, Zhejiang (CN)

( * ) Notice: Subject to any disclaimer, the term of this patent is extended or adjusted under 35 U.S.C. 154(b) by 116 days.

(21) Appl. No.: 14/070,547

(22) Filed: Nov. 3, 2013

(65) Prior Publication Data

US 2015/0042095 A1 Feb. 12, 2015

(30) Foreign Application Priority Data

Aug. 6, 2013 (CN) .................... 2013 2 0476523 U (51) Int. Cl.
*F03B 13/12* (2006.01)
*E02B 9/00* (2006.01)
*F03B 13/26* (2006.01)

(52) U.S. Cl.
CPC ............. *F03B 13/12* (2013.01); *E02B 9/00* (2013.01); *F03B 13/264* (2013.01);
(Continued)

(58) Field of Classification Search
CPC .......... F03B 13/264; F03B 13/12; E02B 9/00; Y02E 10/28; Y02E 10/223
(Continued)

(56) References Cited

U.S. PATENT DOCUMENTS 5,664,418 A * 9/1997 Walters ........................ 60/398
6,208,037 B1 * 3/2001 Mayo et al. .................. 290/54
(Continued)

FOREIGN PATENT DOCUMENTS

CN 102124209 A 7/2011
DE 4124983 A1 4/1992
(Continued)

OTHER PUBLICATIONS

Combined Search and Examination Report in Application No. GB1319236.4 dated May 8, 2015, (pp. 1-7).

*Primary Examiner* — Viet Nguyen
(74) *Attorney, Agent, or Firm* — Muncy, Geissler, Olds & Lowe, P.C.

(57) ABSTRACT

This invention provides a tidal current generating device and an installation frame thereof. The tidal generating device includes an installation frame, at least three hydro turbines, and at least one power generation module. The installation frame of the tidal current generating device includes an outer frame and at least two buoy units. The at least two buoy units are disposed on two sides of the outer frame. When the installation frame of the tidal current generating device is used, the at least two buoy units are vertical to a horizontal plane and parallel to a direction of water flow. The at least three hydro turbines are disposed in parallel within the outer frame. The at least one power generation module is connected with the three hydro turbines. When water flows to the hydro turbines, the hydro turbines rotate to drive the power generation module to generate power.

13 Claims, 10 Drawing Sheets

(52) U.S. Cl.
CPC ....... *F05B 2240/40* (2013.01); *F05B 2240/97* (2013.01); *Y02E 10/28* (2013.01)

(58) Field of Classification Search
USPC ...... 290/42, 53; 405/76; 415/2.1, 4.2, 4.4, 7; 416/84; 417/330–333
See application file for complete search history.

(56) References Cited

U.S. PATENT DOCUMENTS

| | | | |
|---|---|---|---|
| 6,856,036 B2* | 2/2005 | Belinsky | 290/42 |
| 6,974,309 B2* | 12/2005 | Seki | 416/227 R |
| 7,736,127 B1* | 6/2010 | Carr | 416/1 |
| 7,851,936 B2* | 12/2010 | Bolin | 290/54 |
| 2002/0197148 A1 | 12/2002 | Belinsky | |
| 2003/0133782 A1 | 7/2003 | Holter et al. | |
| 2008/0116692 A1* | 5/2008 | Lagstrom et al. | 290/54 |
| 2008/0284168 A1* | 11/2008 | Arduini | 290/43 |
| 2009/0309365 A1* | 12/2009 | Sauer et al. | 290/53 |
| 2009/0315331 A1* | 12/2009 | Poupinet | 290/53 |
| 2010/0066091 A1* | 3/2010 | Park et al. | 290/53 |
| 2010/0232962 A1 | 9/2010 | Bolin | |
| 2010/0237625 A1* | 9/2010 | Dempster | F03B 7/00 290/54 |
| 2011/0025069 A1* | 2/2011 | Kumano | F03B 17/061 290/54 |
| 2011/0049898 A1* | 3/2011 | Larsen | 290/53 |
| 2011/0241347 A1* | 10/2011 | Boureau et al. | 290/53 |
| 2012/0019003 A1* | 1/2012 | Hu | 290/53 |
| 2012/0294705 A1 | 11/2012 | Unno | |
| 2013/0026761 A1* | 1/2013 | Rajadhyaksha et al. | 290/54 |
| 2013/0026762 A1 | 1/2013 | Rajadhyaksha et al. | |
| 2013/0119668 A1* | 5/2013 | Jo | F03B 13/20 290/53 |
| 2014/0026798 A1* | 1/2014 | Yoshimoto et al. | 114/264 |
| 2014/0255160 A1* | 9/2014 | Lin et al. | 415/115 |
| 2014/0306454 A1* | 10/2014 | Lin et al. | 290/53 |
| 2015/0048619 A1* | 2/2015 | Lin | F03B 13/264 290/54 |

FOREIGN PATENT DOCUMENTS

| | | |
|---|---|---|
| GB | 2 434 410 A | 7/2007 |
| GB | 2434410 A | 7/2007 |
| GB | 2 450 077 A | 12/2008 |
| GB | 2450077 A | 12/2008 |
| GB | 2490737 A | 11/2012 |
| JP | 2010-203319 A | 9/2010 |
| JP | 2010203319 | 9/2010 |
| KR | WO 2012011674 A1 * 1/2012 ............. F03B 13/20 |
| WO | WO 2012121247 A1 * 9/2012 |

* cited by examiner

TIDAL CURRENT GENERATING DEVICE AND INSTALLATION FRAME THEREOF

CROSS-REFERENCE TO RELATED APPLICATIONS

This Non-provisional application claims priority under 35 U.S.C. §119(a) on Patent Application No. 201320476523.4 filed in People's Republic of China on Aug. 6, 2013, the entire contents of which are hereby incorporated by reference.

BACKGROUND OF THE INVENTION

Field of the Invention

The present invention relates to a generating device and, more particularly, to a tidal current generating device and an installation frame thereof.

Description of the Related Art

Ocean energy (including tidal current energy, ocean wave energy, and ocean current energy) refers to the mechanical energy generated by the flowing of sea water. As a kind of renewable energy, the ocean energy has great development prospect and value due to its abundant reserve and wide distribution. The primary use of the ocean energy is for power generation. The working principle of ocean energy power generation is similar to that of wind power generation and conventional hydropower generation. That is, the mechanical energy of the sea water is converted into electric energy by energy conversion devices. Specifically, at first, the sea water impacts hydro turbines, the hydro turbines convert the energy of the water flow into the mechanical energy of rotation, and then the hydro turbines drive power generators to generate power via mechanical drive systems, thereby finally converting the mechanical energy to electric energy.

Nowadays, with the increasing shortage of energy and the increasing serious green house effect, energy is required to be low-carbon. Thus, clean energy, such as wind energy and the ocean energy (including tidal energy, the tidal current energy, the ocean wave energy, and the ocean current energy), will be the future direction of energy development. However, the power generating devices for the clean energy are still developing, and the utilization of the ocean energy, particular the tidal current, is still in the initial stage, except for the relatively mature wind energy utilization. No general-purpose and proven devices are available. The efficiency is relatively low, and it is difficult to realize large-scale devices.

BRIEF SUMMARY OF THE INVENTION

To overcome the deficiencies in the prior art, the present invention provides a tidal current generating device and an installation frame thereof with convenient installation and high power generation efficiency.

To achieve the above objective, the invention provides an installation frame of a tidal current generating device including an outer frame and at least two buoy units. The at least two buoy units are disposed on two sides of the outer frame. When the installation frame of the tidal current generating device is used, the at least two buoy units are vertical to a horizontal plane and parallel to a direction of water flow.

According to one embodiment of the invention, the installation frame of the tidal current generating device further includes at least one inner frame detachably disposed within the outer frame.

According to one embodiment of the invention, each buoy unit includes a stationary buoy and an adjustable buoy. The adjustable buoy is parallel to the stationary buoy. When the installation frame of the tidal current generating device is used, the adjustable buoy, relative to the stationary buoy, is located at an end of the outer frame away from the horizontal plane.

According to one embodiment of the invention, the installation frame of the tidal current generating device further includes at least two barriers disposed on other two sides of the inner frame. When the installation frame of the tidal current generating device is used, the at least two barriers are vertical to the horizontal plane and vertical to the direction of the water flow.

According to one embodiment of the invention, the installation frame of the tidal current generating device further includes a dragging ring and a dragging chain. The dragging ring is disposed at the outer frame, and an end of the dragging chain is disposed at the dragging ring.

To achieve another objective of the invention, the invention further provides a tidal generating device including an installation frame of the tidal current generating device, at least three hydro turbines, and at least one power generation module. The installation frame of the tidal current generating device includes an outer frame and at least two buoy units. The at least two buoy units are disposed on two sides of the outer frame. When the installation frame of the tidal current generating device is used, the at least two buoy units are vertical to a horizontal plane and parallel to a direction of water flow. The at least three hydro turbines are disposed in parallel within the outer frame. The at least one power generation module is connected with the three hydro turbines. When water flows to the hydro turbines, the hydro turbines rotate to drive the power generation module to generate power.

According to one embodiment of the invention, the installation frame of the tidal current generating device further includes at least one inner frame detachably disposed within the outer frame.

According to one embodiment of the invention, the tidal current generating device further includes a rotating shaft and a drive unit. The rotating shaft is rotatably disposed at the inner frame, and the drive unit is connected with the rotating shaft to drive the rotating shaft to rotate.

According to one embodiment of the invention, the tidal current generating device further includes at least one water flow deflector fixed to the inner frame and is cylindrical with a diameter decreasing gradually.

According to one embodiment of the invention, each buoy unit includes a stationary buoy and an adjustable buoy. The adjustable buoy is parallel to the stationary buoy; and when the installation frame of the tidal current generating device is used, the adjustable buoy, relative to the stationary buoy, is located at an end of the outer frame away from the horizontal plane.

According to one embodiment of the invention, each hydro turbine includes at least two annular wheel discs and a plurality of blades annularly disposed at the annular wheel discs. The number of the blades is at least 28 and at most the integer number of an outer circumference measured in centimeters of one annular wheel disc. The blades are arc-shaped, and the sum of arc length of one side of all the blades is 0.85-2 times the outer circumference of one annular wheel disc. A blade angle is formed between two line segments respectively connecting the middle point to the two endpoints of an arc of each blade, and the blade angle is in a range of 100°-170°. A blade installation angle is formed between the chord line having the maximum chord length of the arc of each blade and a radius line of each annular wheel disc passing through an outer endpoint of the blade, and the blade installation angle is in a range of 15°-75°.

According to one embodiment of the invention, the installation frame of the tidal current generating device further includes a dragging ring and a dragging chain. The dragging ring is disposed at the outer frame, and an end of the dragging chain is disposed at the dragging ring.

According to one embodiment of the invention, the installation frame of the tidal current generating device further includes at least two barriers disposed on other two sides of the inner frame. When the installation frame of the tidal current generating device is used, the at least two barriers are vertical to the horizontal plane and vertical to the direction of the water flow.

In conclusion, the installation frame of the tidal current generating device in the invention has buoy units to provide buoyancy to the entire frame, such that the entire installation frame can float near the sea level, thereby using the tidal current occurring near the top of the sea effectively. The tidal current generating device in the invention includes at least three hydro turbines distributed in array. Therefore, by the tidal current generating device with the frame provided by the invention, higher power generation efficiency may be achieved without any extremely large hydro turbines. This effectively reduces the manufacturing cost of the power generating device and prolongs the service life of the hydro turbines within the frame.

In addition, due to two barriers disposed vertical to the direction of the water flow, the hydro turbines may be prevented from being damaged caused by the submarine trashes, and the service life of the hydro turbines can be prolonged. Further, when the power generating device is practically assembled, the hydro turbines may be first fixed in the inner frames, and then the multiple inner frames are fixed in the outer frame, respectively, so as to achieve modularized installation. Consequently, the installation procedure is significantly simplified, the installation time is decreased, and the installation difficulty in the ocean is reduced. By the stationary buoy with stationary buoyancy and the adjustable buoy with adjustable buoyancy, the location of the overall tidal current generating device in the water may be effectively adjusted.

Meanwhile, by the dragging ring and the dragging chain, the tidal current generating device and the installation frame thereof may be effectively fixed in the water, which is convenient for maintenance and repair. Furthermore, by the water flow deflector, the water flow is intensively guided to the hydro turbines so that the impellers of the hydro turbines bear greater stress and rotate faster, thus to improve the power generation efficiency.

In certain cases, the efficiency of the hydro turbine is directly proportional to the number of the blades, thereby greatly improving the efficiency. Experimental data shows that the efficiency of the power generation device using the hydro turbine in the invention is 1.4-1.5 times that of the traditional vertical-shaft power generation device. In addition, the center shaft is a hollow shaft, and the friction force between the hydro turbine and the center shaft is reduced by the buoyancy of the hollow center shaft generated by itself, so the working efficiency is effectively improved. Moreover, the hydro turbine is applicable to tidal current and has self-startup capabilities at various current speeds.

To ensure that the above mentioned and other objectives, features, and advantages of the present invention are obviously and easily understood, the following are detailed description with reference to preferable embodiments and accompanying drawings.

DETAILED DESCRIPTION OF THE INVENTION

Figure 1:
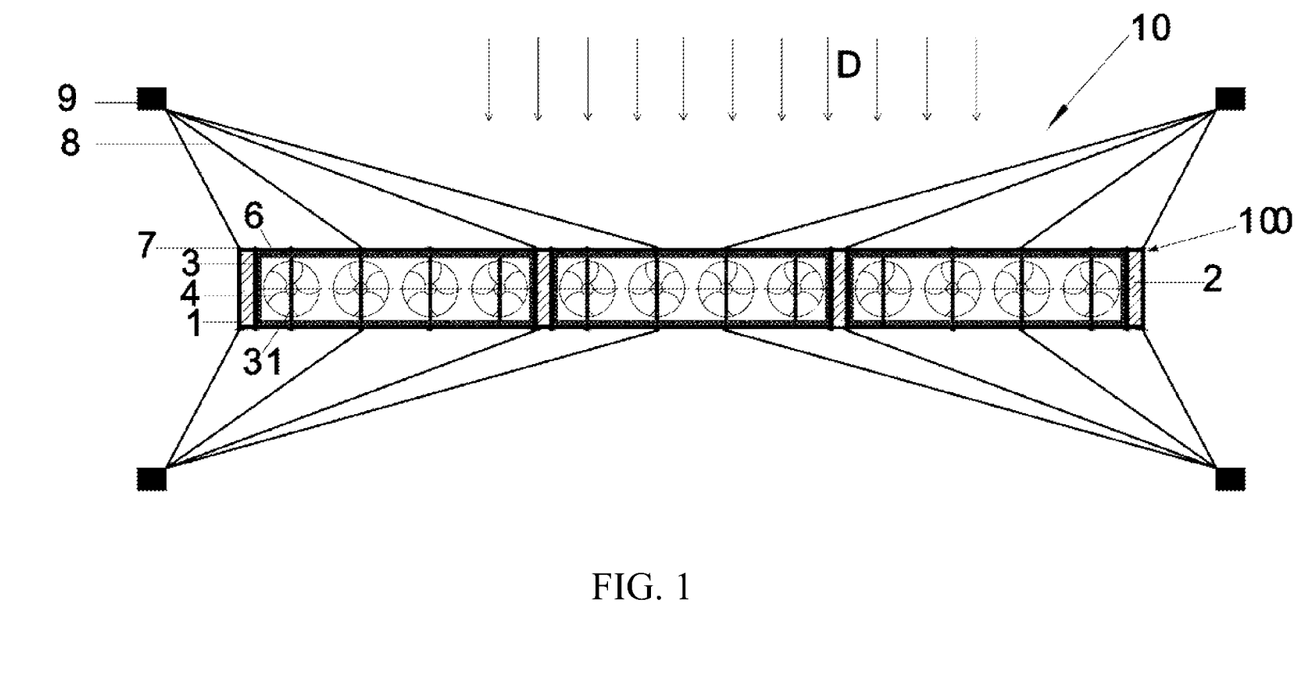
FIG. 1 is a top view of a tidal current generating device and an installation frame thereof according to the first embodiment of this invention.
Figure 2:
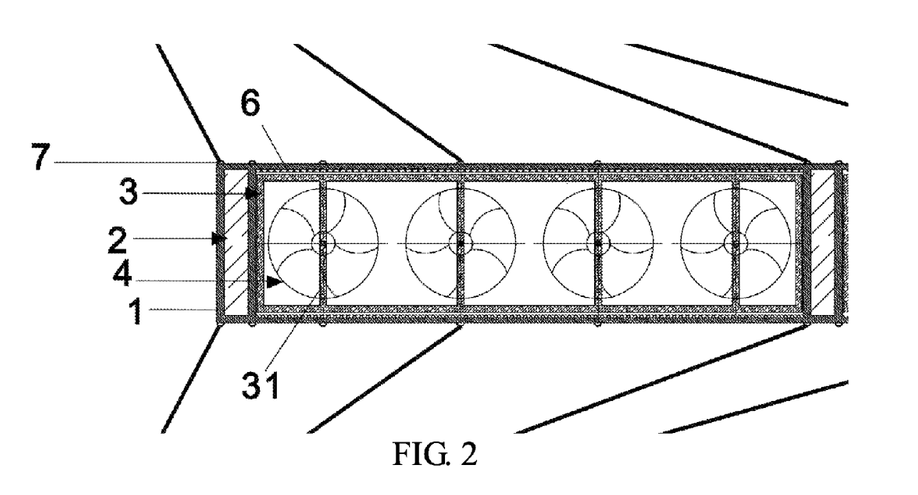
FIG. 2 is a partially enlarged view of FIG. 1.
Figure 3:
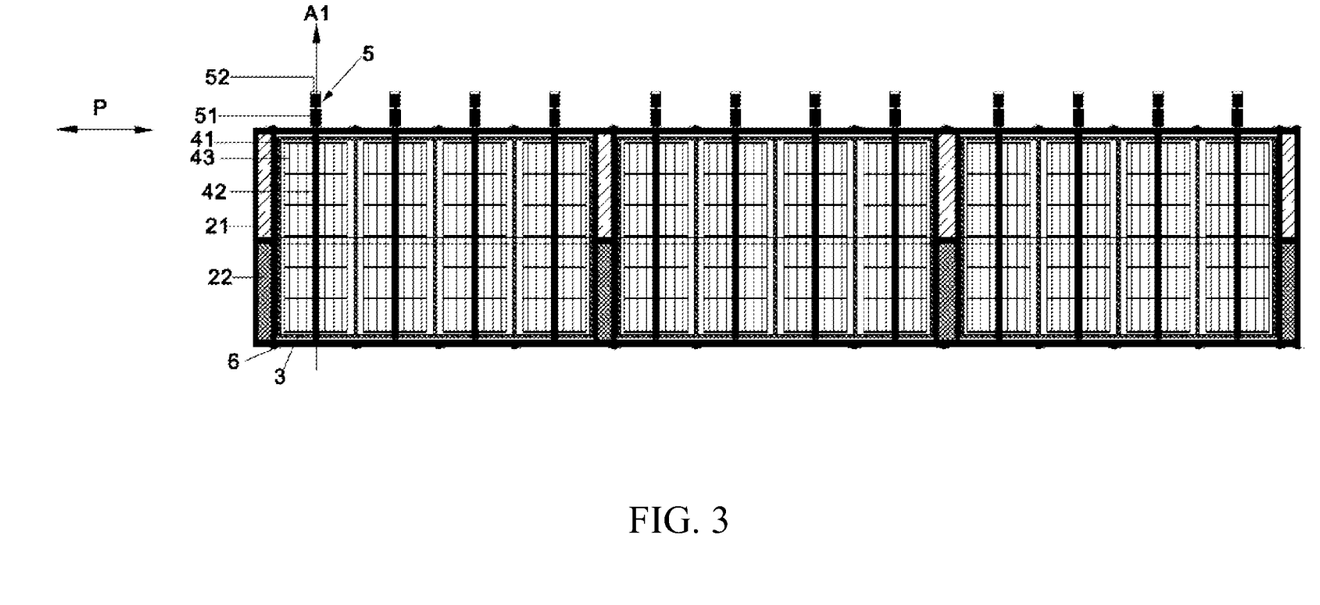
FIG. 3 is a front view of FIG. 1.
Figure 4:
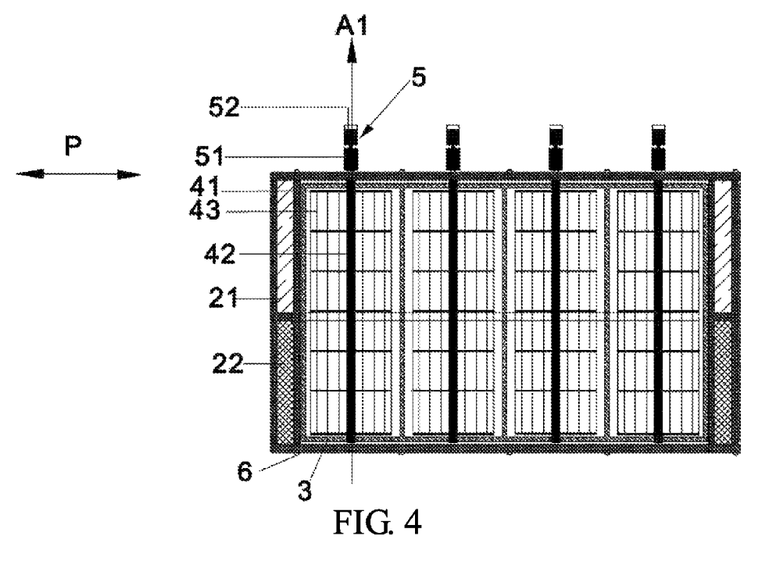
FIG. 4 is a partially enlarged view of FIG. 3.
Figure 5:
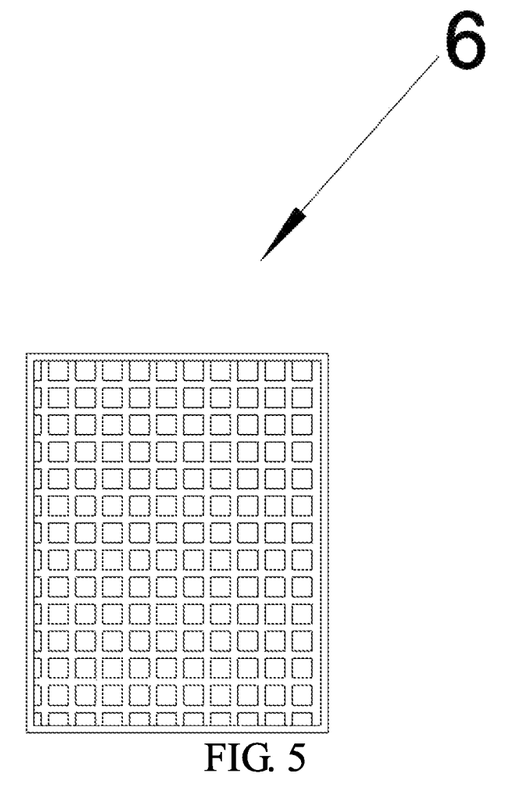
FIG. 5 is a schematic view of a barrier of the installation frame of the tidal current generating device according to the first embodiment of the invention.
Figure 6:
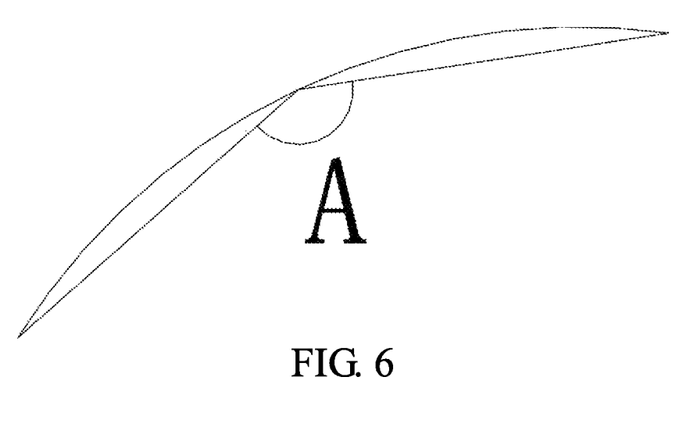
FIG. 6 is a schematic view showing a blade angle of a hydro turbine according to another embodiment of the invention.
Figure 7:
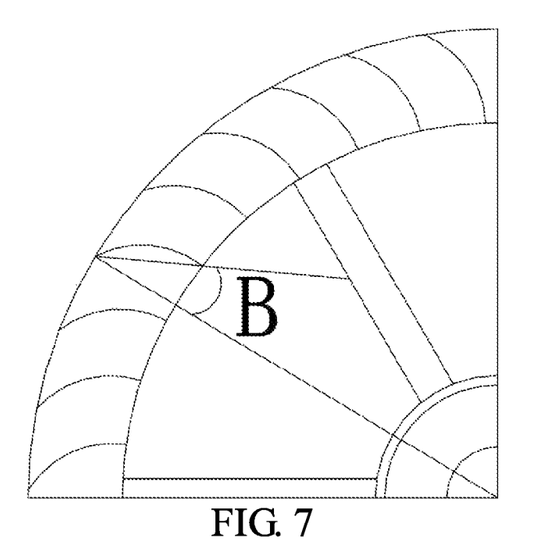
FIG. 7 is a schematic view showing a blade installation angle of the hydro turbine according to another embodiment of the invention.

FIG. 1 is a top view of a tidal current generating device and an installation frame thereof according to the first embodiment of this invention. FIG. 2 is a partially enlarged view of FIG. 1. FIG. 3 is a front view of FIG. 1. FIG. 4 is a partially enlarged view of FIG. 3. FIG. 5 is a schematic view of a barrier of the installation frame of the tidal current generating device according to the first embodiment of the invention. FIG. 6 is a schematic view showing a blade angle of a hydro turbine according to another embodiment of the invention. FIG. 7 is a schematic view showing a blade installation angle of the hydro turbine according to another embodiment of the invention. Please refer to FIG. 1 to FIG. 7 together.

The tidal current generating device 10 includes an installation frame 100 of the tidal current generating device, at least three hydro turbines 4, and at least one power generation module 5. The installation frame 100 of the tidal current generating device includes an outer frame 1 and at least two buoy units 2.

In the first embodiment, half of the outer frame 1 is formed of hollow steel tubes welded together, while the other half is formed of H-shaped steel. Specifically, the upper half of the outer frame 1 is formed of hollow steel tubes welded together. Thus, the outer frame 1 is light in weight, simply structured, easy to process and manufacture, convenient to install, adjust and dismantle, and suitable for engineering applications. Meanwhile, the outer frame 1 can provide buoyancy to the entire tidal current generating device. In addition, the lower half of the outer frame 1 may be formed of H-shaped steel to ensure that the center of gravity of the outer frame 1 falls into the lower half in order to guarantee the stability of the entire outer frame 1.

The at least two buoy units 2 are disposed on two sides of the outer frame 1. When the installation frame 100 of the tidal current generating device is used, the at least two buoy units 2 are vertical to a horizontal plane P and parallel to a direction D of water flow. In the first embodiment, each buoy unit 2 includes a stationary buoy 21 and an adjustable buoy 22. The buoy units 2 are used for providing buoyancy to the entire tidal current generating device 10, such that the power generation module 5 floats above the horizontal plane P, so as to prolong the service life of the power generation module 5 and ensure the normal power generation and operating efficiency of the power generation module 5. The buoyancy provided by the stationary buoy 21 is stationary. The buoyancy of the adjustable buoy 22 may be controlled and adjusted by controlling air volume or water volume therein, thus to change the depth of the entire tidal current generating device 10 located in the water.

In the first embodiment, the adjustable buoy 22 is parallel to the stationary buoy 21. When the installation frame 100 of the tidal current generating device is used, the adjustable buoy 22, relative to the stationary buoy 21, is located at an end of the outer frame 1 away from the horizontal plane P. Specifically, as shown in FIG. 3, the adjustable buoy 22 is disposed below the stationary buoy 21, and the adjustable buoy 22 and the stationary buoy 21 are distributed along a same straight line. As the buoyancy of the adjustable buoy 22 is adjustable, by disposing the adjustable buoy 22 below rather than above the stationary buoy 21, the depth of the entire tidal current generating device 10 located in the water may be effectively and quickly adjusted. Therefore, the installation and maintenance of the entire tidal current generating device 10 become more convenient.

In the first embodiment, the installation frame 100 of the tidal current generating device further includes at least one inner frame 3 detachably disposed within the outer frame 1. As shown in FIG. 3, there are three inner frames 3 and four buoy units 2. Two of the buoy units 2 are disposed on the left and right sides of the outer frame 1, while the other two buoy units 2 are disposed between two adjacent inner frames 3. In actual application, there is one more buoy unit 2 than inner frame 3, so that both two sides of each inner frame 3 may be disposed with the buoy units 2. Due to such arrangement, not only the two sides of the outer frame 1 have buoy units 2, the middle of the outer frame 1 also has buoy units 2. Therefore, the distribution of buoyancy borne by the entire tidal current generating device 10 is more uniform, such that the location of the tidal current generating device 10 in the water is more stable.

In actual application, the hydro turbines 4 may be first fixed within the inner frames 3, and then the multiple inner frames 3 are fixed in the outer frame 1, respectively, so as to achieve modularized installation and array distribution of the hydro turbines 4. In this embodiment, the inner frame 3 may have a hook and the outer frame 1 may have a slot. The inner frame 3 is embedded into the outer frame 1 through the engagement of the hook and the slot. However, the fixing manner of the inner frame 3 and the outer frame 1 in the invention should not be limited thereto.

In the embodiment, the installation frame 100 of the tidal current generating device further includes at least two barriers 6 disposed on other two sides of the inner frame 3. When the installation frame 100 of the tidal current generating device is used, the at least two barriers 6 are vertical to the horizontal plane P and vertical to the direction D of the water flow. Specifically, viewed from the direction shown in FIG. 1, the buoy units 2 are disposed on the left and right sides of the inner frame 3, and the barriers 6 are disposed on the upper and lower sides of the inner frame 3. In this embodiment, the two barriers 6 are fixed between the inner frame 3 and the outer frame 1. However, the invention is not limited thereto. In other embodiments, the barriers 6 may be disposed outside of the outer frame 1 and located on the upper and lower sides of the outer frame 1. By the barriers 6, the submarine trashes may be effectively prevented from being drawn into the hydro turbines 4, thus to protect the hydro turbines 4 and to prolong the service life of the hydro turbines 4. As shown in FIG. 5, the barriers 6 have lattice grains. However, the invention is not limited thereto.

In the first embodiment, the installation frame 100 of the tidal current generating device further includes a dragging ring 7 and a dragging chain 8. The dragging ring 7 is disposed at the outer frame 1, and an end of the dragging chain 8 is disposed at the dragging ring 7. Specifically, a plurality of dragging rings 7 is disposed at the outer frame 1. An end of each one of a plurality of dragging chains 8 is disposed through the dragging rings 7, while the other end thereof is fixed to piles 9 on the shore. Preferably, there are more than four dragging rings 7, four of which are disposed at four corners of the outer frame 1, respectively. Due to the arrangement of the dragging rings 7 and the dragging chains 8, the tidal current generating device 10 can be fixed in the water, which is also convenient for maintenance and repair.

In the first embodiment, every four hydro turbines 4 are disposed in parallel in one inner frame 3. However, the invention is not limited thereto. In other embodiments, if the installation frame 100 of the tidal current generating device does not have an inner frame 3, the hydro turbines 4 can be disposed in parallel directly in the outer frame 1. In the first embodiment, the hydro turbines 4 are vertical-axis hydro turbines, that is, the axial direction A1 of the hydro turbines 4 is vertical to the horizontal plane P.

Any kinds of hydro turbines are suitable for the tidal current generating device 10 and the installation frame 100 of the tidal current generating device in the invention. In this embodiment, each of the hydro turbines 4 includes at least two annular wheel discs 41, a central shaft 42, and a plurality of blades 43. The central shaft 42 is disposed through the center of the annular wheel discs 41. The axial direction of the central shaft 42 (i.e. the axial direction A1 of the hydro turbines 4) is vertical to the radial direction of the annular wheel discs 41, and an end of the central shaft 42 is connected with the power generation module 5. A plurality of blades 43 is disposed annularly disposed at the annular wheel discs 41, and the two annular wheel discs 41 are located at two ends of these blades 43. However, the kind of the hydro turbines 4 should not be limited in the invention.

In another embodiment, the hydro turbines 4 can adopt specific hydro turbines. Each hydro turbine includes at least two annular wheel discs and a plurality of blades annularly disposed at the annular wheel discs. The number of the blades is at least 28 and at most the integer number of an outer circumference measured in centimeters of one annular wheel disc. For example, the outer circumference of the annular wheel disc is 98.3 or 98.8 cm, and then the number of the blades can be 98. The blades are arc-shaped, and the sum of arc length of one side of all the blades is 0.85-2 times the outer circumference of one annular wheel disc. A blade angle A is formed between two line segments respectively connecting the middle point to the two endpoints of an arc of each blade 4 (as shown in FIG. 6), and the blade angle A is larger than or equal to 100 degrees and is smaller than or equal to 170 degrees. A blade installation angle B is formed between the chord line having the maximum chord length of the arc of each blade 4 and a radius line of each annular wheel disc 2 passing through an outer endpoint of the blade 4 (as shown in FIG. 7), and the blade installation angle B is larger than or equal to 15 degrees and is smaller than or equal to 75 degrees. In actual use, the blade installation angle B may be 15°, 45°, 60°, etc.

In the first embodiment, as shown in FIG. 1, the cross-section of the inner frame 3 when overlooked is rectangular, with at least one crosspiece 31 in the middle of the rectangular cross-section. Correspondingly, a crosspiece 31 is also provided on the bottom of the inner frame 3. Two ends of the central shaft 42 are rotatably disposed at the crosspiece 31. The number of the crosspieces 31 on the top or bottom equals to the number of the central shafts 42 or the number of the hydro turbines 4. In this embodiment, each inner frame 3 has four crosspieces 31 on the top or bottom.

In the first embodiment, due to the large dimension of the entire hydro turbines 4, there are total seven annular wheel discs 41. However, the number of the annular wheel discs 41 should not be limited in the invention. In this embodiment, the central shaft 42 is a hollow shaft, so that the hydro turbines 4 can reduce the friction between the hydro turbines 4 and the frame 1 due to own buoyancy of the central shaft 42, and the work efficiency is thus effectively improved.

There are three or more than three hydro turbines 4 in the invention. The existing power generating devices usually adopt one hydro turbine. However, when only one hydro turbine is used, in order to improve the power generation efficiency, the diameter of the hydro turbine is usually extremely large. This will significantly reduce the rotating rate of the hydro turbine and meanwhile increase the torque. Consequently, the friction between the central shaft and the gear box is increased, and the cost thereof is increased. In addition, the scale of the entire power generating device will also be limited. However, the tidal current generating device of this invention adopts at least three hydro turbines 4 distributed in array, and in this way, each hydro turbine 4 needs not to be extremely large. Therefore, the manufacturing cost of the hydro turbines 4 is effectively reduced and the service life of the hydro turbines 4 is prolonged on the premise that the power generation efficiency is guaranteed or even improved.

In the first embodiment, the number of the hydro turbines 4 is an even number, and two adjacent hydro turbines 4 are axially symmetrically arranged so as to rotate in opposite directions. Specifically, the multiple hydro turbines 4 are distributed in parallel and in array, and the bending directions of the blades 43 of the two adjacent hydro turbines 4 are axially symmetrical. As shown in FIG. 2, every two hydro turbines 4 form a group and are disposed in parallel. The hydro turbine 4 on the left side rotates in a clockwise direction, while the hydro turbine 4 on the right side rotates in a counter-clockwise direction. By setting the rotating directions of the adjacent hydro turbines 4 to be opposite, the collection and the evacuation of water are effectively improved and the flowing rate is also improved. Thus, the hydro turbines 4 rotate faster to improve the power generation efficiency of the power generation module 5. However, the number and rotating directions of the hydro turbines 4 are not limited in the invention.

At least one power generation module 5 is connected with at least three hydro turbines 4. When water flows to the hydro turbines 4, the hydro turbines 4 rotate to drive the power generation module 5 to generate power. In the first embodiment, each power generation module 5 corresponds to one hydro turbine 4. FIG. 1 shows twelve hydro turbines 4 and twelve power generation modules 5. However, the invention is not limited thereto. Each power generation module 5 includes a gear box 51 and a generator 52. There is a gear set (not shown) in the gear box 51. The gear axle hole of one of the gears is engaged to an end of the central shaft 42 and drives this gear to rotate along with the rotation of the central shaft 42, and then the mechanical energy is transferred to the generator 52 via the engagement of the gears, thus the generator 52 is driven to generate power.

Figure 8:
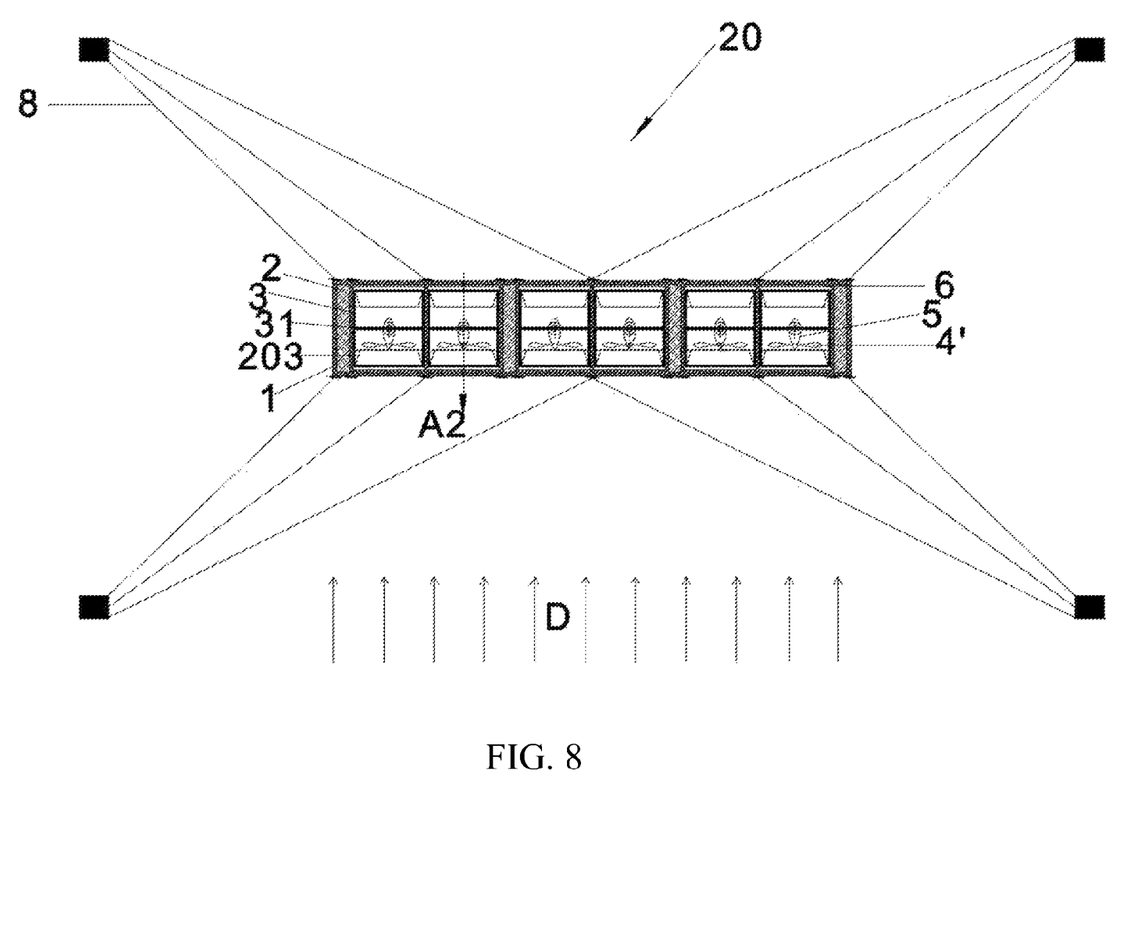
FIG. 8 is a top view of a tidal current generating device and an installation frame thereof according to the second embodiment of the invention.
Figure 9:
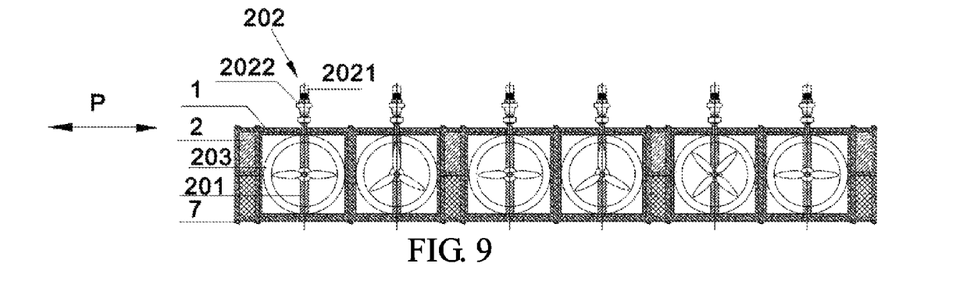
FIG. 9 is a front view of FIG. 8.

FIG. 8 is a top view of a tidal current generating device and an installation frame thereof according to the second embodiment of the invention. FIG. 9 is a front view of FIG. 8. Please refer to FIG. 8 and FIG. 9 together. The structure of and the connection relation among the outer frame 1, the buoy units 2, the inner frame 3, the power generation module 5, the barriers 6, the dragging ring 7, and the dragging chain 8 in the second embodiment are the same as those described in the first embodiment, and will not be described here for a concise reason. The same elements are indicated in the same reference numbers. Only the difference is described below.

In the second embodiment, only one hydro turbine 4' is disposed in each inner frame 3. The tidal current generating device 20 has at least three inner frames 3, that is, includes at least three hydro turbines 4'. In this embodiment, there are six inner frames 3 and six hydro turbines 4'.

In the second embodiment, the hydro turbines 4' are horizontal-axis hydro turbines, i.e. the axial direction A2 of the hydro turbines 4' is parallel to the horizontal plane P. The tidal current generating device 20 further includes a rotating shaft 201 and a drive unit 202. The rotating shaft 201 is rotatably disposed at the inner frame 3. The drive unit 202 is connected with the rotating shaft 201 to drive the rotating shaft to rotate. In this embodiment, the hydro turbines 4' may be one of turbines with two impellers, turbines with three impellers and turbines with four impellers or any combination thereof.

In this embodiment, the drive unit 202 includes a motor 2021 and a reducer 2022. The reducer 2022 is connected with an end (the upper end in FIG. 9) of the rotating shaft 201, the motor 2021 drives the rotating shaft 201 to rotate through the reducer 2022. As the existing motor 2021 rotates fast, the rotating rate of the motor 2021 is considerably reduced by the reducer 2022, so that the rotating rate and the rotating range of the rotating shaft 201 may be controlled effectively and precisely.

In actual application, when the water flows to the tidal current generating device 20 in the direction D, the drive unit 202 does not operate. At this time, the hydro turbines 4' face the water flow. When the water flows to the tidal current generating device 20 in a direction opposite to the direction D (in FIG. 8, from top to down), the drive unit 202 drives the rotating shaft 201 to rotate, thus to drive the hydro turbine 4' to rotate by 180°. This changes the hydro turbines 4' to face top from facing down, thereby ensuring that the impellers of the hydro turbines 4' always face the water flow. This case is particularly appropriate for power generation by tidal current, so that a maximum generation power is ensured.

In the second embodiment, the tidal current generating device 20 further includes at least one water flow deflector 203, and the water flow deflector 203 is fixed in the inner frame 3 and is cylindrical, the diameter of which decreases gradually. In this embodiment, the number of the water flow deflectors 203 is twice the number of the rotating shafts 201, and every two water flow deflectors 203 are axially symmetrically arranged and located on two sides of the hydro turbines 4'. Specifically, two water flow deflectors 203 are axially symmetric to each other about the crosspiece 31 of the inner frame 3. As shown in FIG. 8, the diameter of the upper water flow deflector 203 decreases gradually from top to down, while the diameter of the lower water flow deflector 203 decreases from bottom to top. By the water flow deflectors 203, the water flow is intensively guided to the hydro turbines 4' so that the impellers of the hydro turbines 4' bear greater stress and rotate faster, thus to improve the power generation efficiency. However, the number and shape of the water flow deflectors 203 should not be limited in the invention.

Figure 10:
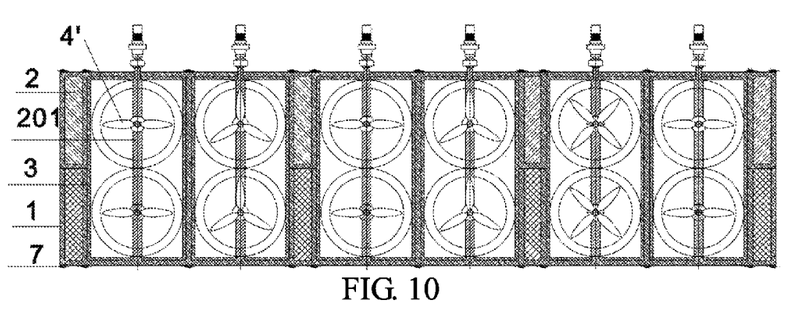
FIG. 10 is a front view of a tidal current generating device and an installation thereof according to the third embodiment of the invention.

FIG. 10 is a front view of a tidal current generating device and an installation thereof according to the third embodiment of the invention. The outer frame 1, the buoy unit 2, the inner frame 3, the hydro turbines 4', the power generation module, the barriers, the dragging ring 7 and the dragging chain 8 in the third embodiment and the connection relation thereof are the same as those described in the second embodiment, and will not be described here for a concise reason. The same elements are indicated in the same reference numbers. Only the difference is described below.

In the third embodiment, the number of the hydro turbines 4' is twice the number of the rotating shafts 201, that is, each rotating shaft 201 is fixed with two hydro turbines 4'. Two hydro turbines 4' are disposed in each inner frame 3. However, the invention is not limited thereto. In other embodiments, each rotating shaft 201 may be fixed with more than three hydro turbines 4'.

In conclusion, the installation frame of the tidal current generating device in the invention has buoy units to provide buoyancy to the entire frame, such that the entire installation frame can float near the sea level, thereby using the tidal current occurring near the top of the sea effectively.

The tidal current generating device in the invention includes at least three hydro turbines distributed in array. Therefore, by the tidal current generating device with the frame provided by the invention, higher power generation efficiency may be achieved without any extremely large hydro turbines. This effectively reduces the manufacturing cost of the power generating device and prolongs the service life of the hydro turbines within the frame.

In addition, due to two barriers disposed vertical to the direction of the water flow, the hydro turbines may be prevented from being damaged caused by the submarine trashes, and the service life of the hydro turbines can be prolonged. Further, when the power generating device is practically assembled, the hydro turbines may be first fixed in the inner frames, and then the multiple inner frames are fixed in the outer frame, respectively, so as to achieve modularized installation. Consequently, the installation procedure is significantly simplified, the installation time is decreased, and the installation difficulty in the ocean is reduced. By the stationary buoy with stationary buoyancy and the adjustable buoy with adjustable buoyancy, the location of the overall tidal current generating device in the water may be effectively adjusted.

Meanwhile, by the dragging ring and the dragging chain, the tidal current generating device and the installation frame thereof may be effectively fixed in the water, which is convenient for maintenance and repair. Furthermore, by the water flow deflector, the water flow is intensively guided to the hydro turbines so that the impellers of the hydro turbines bear greater stress and rotate faster, thus to improve the power generation efficiency.

In certain cases, the efficiency of the hydro turbine is directly proportional to the number of the blades, thereby greatly improving the efficiency. Experimental data shows that the efficiency of the power generation device using the hydro turbine in the invention is 1.4-1.5 times that of the traditional vertical-shaft power generation device. In addition, the center shaft is a hollow shaft, and the friction force between the hydro turbine and the center shaft is reduced by the buoyancy of the hollow center shaft generated by itself, so the working efficiency is effectively improved. Moreover, the hydro turbine is applicable to tidal current and has self-startup capabilities at various current speeds.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An installation frame of a tidal current generating device, comprising:
   an outer frame having a height, a width and a thickness;
   at least two buoy units disposed on two sides of the outer frame, when the installation frame of the tidal current generating device is used, a direction of the at least two buoy units parallel to the height of the outer frame being vertical to a horizontal plane and perpendicular to a direction of water flow, each buoy unit extending the height and thickness of the outer frame;
   at least one inner frame detachably disposed within the outer frame, each inner frame being modular for attachment to the outer frame; and
   a hydro turbine, wherein the hydro turbine comprises:
   at least two annular wheel discs and a plurality of blades annularly disposed at the annular wheel discs; the number of the blades is at least equal to 28 and at most is equal to the integral number of centimeters in an outer circumference of one annular wheel disc;
   the blades are arc-shaped and the sum of arc length of one side of all the blades is 0.85-2 times the outer circumference of one annular wheel disc;
   a blade angle is formed between two line segments respectively connecting the middle point to the two endpoints of an arc of each blade and the blade angle is in a range of 100°-170°; and
   a blade installation angle is formed between the chord line having the maximum chord length of the arc of each blade and a radius line of each annular wheel disc passing through an outer endpoint of the blade and the blade installation angle is in a range of 15°-75°.

2. The installation frame of a tidal current generating device according to claim 1, wherein each buoy unit comprises a stationary buoy and an adjustable buoy, the adjustable buoy is parallel to and below the stationary buoy, and when the installation frame of the tidal current generating device is used, the adjustable buoy, relative to the stationary buoy, is located at a lower end of the outer frame.

3. The installation frame of a tidal current generating device according to claim 1, further comprising at least two barriers disposed on other two sides of the inner frame, when the installation frame of the tidal current generating device is used, the at least two barriers being vertical to the horizontal plane and vertical to the direction of the water flow.

4. The installation frame of a tidal current generating device according to claim 1, further comprising a dragging ring and a dragging chain, the dragging ring being disposed at the outer frame and an end of the dragging chain being disposed at the dragging ring.

5. A tidal current generating device, comprising:
an installation frame of the tidal current generating device, comprising:
an outer frame having a height, a width and a thickness; and
at least two buoy units disposed on two sides of the outer frame, when the installation frame of the tidal current generating device is used, a direction of the at least two buoy units parallel to the height of the outer frame being vertical to a horizontal plane and perpendicular to a direction of water flow, each buoy unit extending the height and thickness of the outer frame;
at least one inner frame detachably disposed within the outer frame, each inner frame being modular for attachment to the outer frame;
at least three hydro turbines disposed in parallel within the outer frame; and
at least one power generation module connected with the at least three hydro turbines, when water flows to the hydro turbines, the hydro turbines rotating to drive the power generation module to generate power;
wherein each hydro turbine comprises:
at least two annular wheel discs and a plurality of blades annularly disposed at the annular wheel discs; the number of the blades is at least equal to 28 and at most is equal to the integral number of centimeters in an outer circumference of one annular wheel disc;
the blades are arc-shaped and the sum of arc length of one side of all the blades is 0.85-2 times the outer circumference of one annular wheel disc;
a blade angle is formed between two line segments respectively connecting the middle point to the two endpoints of an arc of each blade and the blade angle is in a range of 100°-170°; and
a blade installation angle is formed between the chord line having the maximum chord length of the arc of each blade and a radius line of each annular wheel disc passing through an outer endpoint of the blade and the blade installation angle is in a range of 15°-75°.

6. The tidal current generating device according to claim 5, wherein each buoy unit comprises a stationary buoy and an adjustable buoy, the adjustable buoy is parallel to and below the stationary buoy; and when the installation frame of the tidal current generating device is used, the adjustable buoy, relative to the stationary buoy, is located at a lower end of the outer frame.

7. The tidal current generating device according to claim 5, wherein the installation frame of the tidal current generating device further comprises a dragging ring and a dragging chain, and the dragging ring is disposed at the outer frame and an end of the dragging chain is disposed at the dragging ring.

8. The tidal current generating device according to claim 5, wherein the installation frame of the tidal current generating device further comprises at least two barriers disposed on other two sides of the inner frame, and when the installation frame of the tidal current generating device is used, the at least two barriers are vertical to the horizontal plane and vertical to the direction of the water flow.

9. An installation frame of a tidal current generating device, comprising:
an outer frame having a height, a width and a thickness;
a plurality of inner frames detachably disposed end-to-end within the outer frame, each inner frame being modular for attachment to the outer frame;
at least two buoy units disposed on two sides of the outer frame, when the installation frame of the tidal current generating device is used, a direction of the buoy units parallel to the height of the outer frame being vertical to a horizontal plane and perpendicular to a direction of water flow, each buoy unit extending the height and thickness of the outer frame;
wherein each buoy unit comprises a stationary buoy and an adjustable buoy distributed along a vertical line, the adjustable buoy being parallel to and below the stationary buoy, and when the installation frame of the tidal current generating device is used, the adjustable buoy, relative to the stationary buoy, is located at a lower end of the outer frame.

10. A tidal current generating device, comprising:
an installation frame of the tidal current generating device, comprising:
an outer frame having a height, a width and a thickness;
a plurality of inner frames detachably disposed end-to-end within the outer frame, each inner frame being modular for attachment to the outer frame;
at least two buoy units disposed on two sides of the outer frame, when the installation frame of the tidal current generating device is used, a direction of the buoy units parallel to the height of the outer frame being vertical to a horizontal plane and perpendicular to a direction of water flow, each buoy unit extending the height and thickness of the outer frame;
wherein each buoy unit comprises a stationary buoy and an adjustable buoy distributed along a vertical line, the adjustable buoy being parallel to and below the stationary buoy, and when the installation frame of the tidal current generating device is used, the adjustable buoy, relative to the stationary buoy, is located at a lower end of the outer frame;
at least three hydro turbines disposed in parallel within the outer frame; and
at least one power generation module connected with the at least three hydro turbines, when water flows to the hydro turbines, the hydro turbines rotating to drive the power generation module to generate power.

11. The tidal current generating device according to claim 10, further comprising a rotating shaft and a drive unit, the rotating shaft being rotatably disposed at the inner frame, and the drive unit being connected with the rotating shaft to drive the rotating shaft to rotate.

12. The tidal current generating device according to claim 10, further comprising at least one water flow deflector fixed to the inner frame and being cylindrical with a diameter decreasing gradually.

13. The installation frame according to claim 10, further comprising a plurality of crosspieces, each crosspiece extending across an inner frame and being associated with one of said hydro turbines.

* * * * *